United States Patent [19]
Kwolek

[11] Patent Number: 5,509,511
[45] Date of Patent: Apr. 23, 1996

[54] HYBRID BRAKE ASSEMBLY WITH FRICTION PADS OF DIFFERENT COMPOSITIONS

[75] Inventor: John P. Kwolek, Cross Junction, Va.

[73] Assignee: Pneumo Abex Corporation, Hampton, N.H.

[21] Appl. No.: 185,124

[22] Filed: Jan. 24, 1994

[51] Int. Cl.⁶ .................................................. F16D 69/00
[52] U.S. Cl. ............................................... 188/251 A
[58] Field of Search ........................... 188/251 R, 251 A, 188/251 M, 250 B, 255, 257; 192/107 M

[56] References Cited

U.S. PATENT DOCUMENTS 3,856,120  12/1974  Kwolek et al. ................. 188/251 A
4,438,004  3/1984  Myers .......................... 188/251 R X

FOREIGN PATENT DOCUMENTS 0264096  4/1988  European Pat. Off. ........... 188/251 A
0444473  9/1991  European Pat. Off. ........... 188/251 A
0214418  10/1984  Germany ........................ 188/251 A Primary Examiner—Josie Ballato
Attorney, Agent, or Firm—Thomas S. Baker, Jr.

[57]  ABSTRACT

A hybrid brake assembly is provided with both a resin-bonded metallic friction pad element and a resin-bonded non-asbestos, non-metallic friction pad element and hydraulic cylinder/piston elements for simultaneously actuating both friction pad elements in a vehicular braking operation.

6 Claims, 1 Drawing Sheet

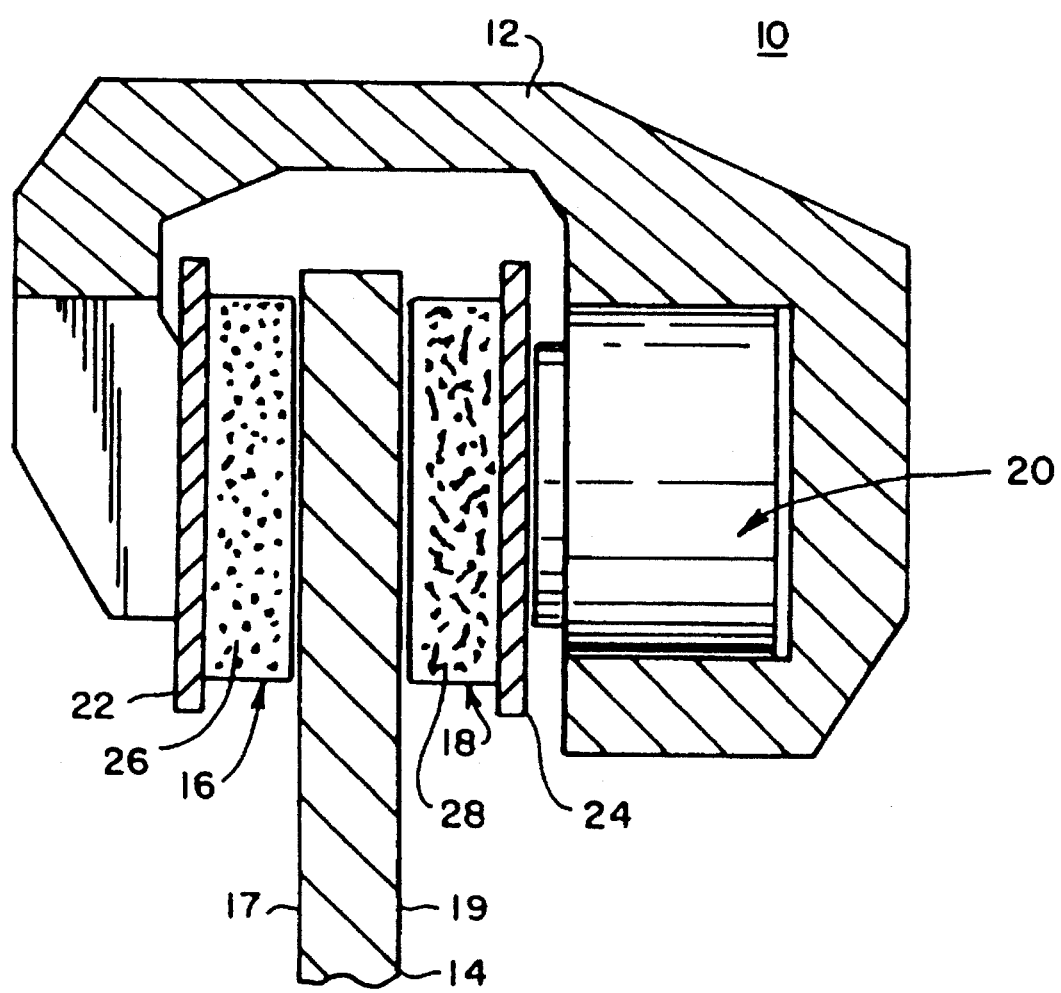

HYBRID BRAKE ASSEMBLY WITH FRICTION PADS OF DIFFERENT COMPOSITIONS

This invention relates generally to brake systems of the type used in domestic road vehicle applications, and particularly concerns a brake system brake assembly which utilizes two different types of friction pad components to obtain improved brake assembly and braking system performance.

BACKGROUND OF THE INVENTION

Requirements relating to the design and manufacture of road vehicles in the United States have been greatly influenced by regulations issued by the U.S. Department of Transportation. As a consequence, the development of improved brake assemblies has been occurring over a considerable period of time. Increased brake designer attention has been given to meeting governmental vehicle brake system operating requirements, particularly as expressed in vehicle stopping distance specifications. Such has resulted in the publication of at least one known brake assembly construction utilizing two opposed brake friction pads fabricated using different friction material compositions. Specifically, U.S. Pat. No. 3,856,120 discloses a vehicle disc brake assembly invention made jointly by myself and Patrick A. Thesier which includes both a semi-metallic friction pad and an organic friction pad, the organic friction pad containing asbestos fibers in the range of from 20 to 60 percent by volume.

However, in order to avoid asbestos-containing compositions in the manufacture and use of brake system friction pads it becomes necessary to devise new friction material formulations. In the process I have discovered that new brake assembly and brake system operating characteristics such as increased cold stopping and reduced noise generation may be realized with particular new friction pad material combinations.

Other brake system advantages also may be realized through the practice of my invention.

SUMMARY OF THE INVENTION

To provide a brake system with improved cold stopping and noise reduction operating capabilities, I have devised a disc brake assembly that includes both a semi-metallic friction pad and an opposed non-asbestos, non-metallic friction pad with the ingredients of each pad being resin bonded into a unitary shape in the usual manner. The semi-metallic friction pad includes from 25 percent to 60 percent by weight of metallic particles/fibers. The non-asbestos, non-metallic friction pad includes from 10 percent to 25 percent by weight of fiber particles from the group consisting of glass fibers, ceramic fibers, thermal fibers, polyacrylonitrile fibers, aramid fibers, and steel fibers, the steel fibers being a minor proportion of the non-asbestos composition total fiber content.

During brake assembly operation the opposed semi-metallic and non-asbestos friction pads essentially simultaneously contact a cooperating brake assembly rotor to develop the referenced operating advantages throughout a wide range of brake system ambient temperatures.

DESCRIPTION OF THE DRAWINGS

FIG. 1 is a schematic, sectioned, elevational view of a portion of a vehicle wheel brake assembly illustrating the assembly friction pad elements of this invention in cooperation with the brake assembly rotor element.

DETAILED DESCRIPTION

Referring to the schematic illustration of FIG. 1, a preferred embodiment of the hybrid brake assembly of this invention is designated generally as 10 and is essentially comprised of a caliper-type stator element (12), a rotor element (14), and an opposed pair of brake friction pad assembly elements (16 and 18). During brake system operation, elements (16 and 18) are each forced into a frictional surface-to-surface engagement with the opposed faces (17 and 19) of rotor (14) by operator actuation of a state-of-the-art hydraulic cylinder/piston combination designated generally as 20. Rotor (14) because of its fixed relation to the hub of the incorporating vehicle wheel, rotates about the wheel axis with the wheel; caliper-type stator (12) is restrained from rotation with rotor (14) during vehicle braking by its mechanical connection to a vehicle frame (not shown).

In the preferred brake assembly embodiment (10), each of friction pad assemblies (16 and 18) is provided with a metallic backing plate element, (22 and 24) respectively, and also with a friction pad element, (26 and 28) respectively. Friction pad elements (26 and 28) are fabricated of different friction-generating materials with friction pad element (26) being manufactured of a resin-bonded metallic composition and element (28) being manufactured of a resin-bonded, non-asbestos and non-metallic composition each as specified herein. Pad elements (26 and 28) are typically joined to their respective backing plate elements (22 and 24) by a cured state-of-the-art adhesive or by mechanical fastener devices such as rivets or bolts (not illustrated).

The Mixture 1 detailed in the following Table 1 is an example of a particulate composition useful for fabricating resin-bonded metallic friction pad element (26) whereas Mixture 2 detailed in Table 2 is an example of a particulate composition useful for fabricating resin-bonded non-asbestos, non-metallic friction pad element (28). All parts proportions given in such Tables are on a percentage weight basis.

TABLE 1

| Ingredient | Mixture 1 Formula | Ingredient Range |
|---|---|---|
| Metallic/Particles/Fibers | 55 | 25–60 |
| Resin Binder Particles | 10 | 5–15 |
| Carbonaceous Particles | 18 | 10–25 |
| Abrasive Particles | 4 | 0–8 |
| Filler Particles | 8 | 3–25 |
| Friction Particles | 5 | 0–10 |
| Total | 100.0 | |

TABLE 2

| Ingredient | Mixture 2 Formula | Ingredient Range |
|---|---|---|
| Fiber Particles | 12 | 10–25 |
| Resin Binder Particles | 12 | 8–20 |
| Carbonaceous Particles | 12 | 2–18 |
| Abrasive Particles | 15 | 2–20 |
| Filler Particles | 39 | 20–40 |
| Friction Particles | 10 | 5–20 |
| Total | 100.0 | |

In the preparation of composition mixtures for use in molding the friction pad elements of this invention I prefer that the specified resin binder particles be either straight or modified phenolic resin particles. The required carbonaceous particles are preferably either graphite particles, coke particles, or even coal particles. For the abrasive particles constituent I prefer to use either magnesia, silica, alumina, or aluminum silicate particles and the like. For the filler particles ingredient I prefer to select materials from the group comprised of barytes particles, calcium carbonate particles, rottenstone (siliceous limestone) particles, and the like. The friction particles, if used in the preparation of mixtures for molding either friction pad element (26) or friction pad element (28), normally are particulate tire peels or like friction-generating constituents well-known in the brake fabrication industry. Also, the metallic particles constituent in the mixture used in fabricating the metallic friction pad element (26) is from the group consisting of iron oxide powder, iron particles and steel fibers.

Friction pad element (28) is characterized as a non-asbestos and non-metallic friction pad. Essentially, I use in the Mixture 2 formulation fibrous particles other than asbestos to aid in developing in the incorporating brake system or brake assembly a capability for increased braking friction particularly in connection with initial or first stopping and also in connection with system operation in system ambient temperatures below approximately zero degrees Fahrenheit. As substitute fiber particles I normally select fiber particles from the group comprised of glass fiber particles, ceramic fiber particles, thermal (e.g., rockwool and mineral wool) fiber particles, polyacrylonitrile fiber particles, aramid fiber particles, and minor amounts of steel wool fiber particles (i.e., less than 5%). Although the Mixture 2 composition may contain some steel wool particles, the friction material is still considered to be non-metallic because the minor amount in the fiber particles ingredient is a very small proportion in the total composition in comparison to the amount of metallic particles contained in either the Table 1 compositions or in other known metallic or semi-metallic friction pad friction materials.

In one method of fabricating the above-specified friction material compositions I prefer that the measured required amount of particulate mixture be uniformly distributed in a friction pad cavity of a friction pad mold apparatus preheated to a temperature of approximately 320 degrees Fahrenheit. The distributed material is then compressed in the mold apparatus friction pad cavity to an isostatic pressure of approximately 2000 pounds per square inch, and the cavity afterwards vented at 1-minute, 2-minute, and 3-minute elapsed times. Next the mold compression forces are preferably increased to a level that will produce an isostatic compression pressure of approximately 4000 pounds per square inch in the compressed mixture, and that level of compression is preferably maintained for a period of at least approximately 2 minutes. Lastly, the so-compressed and partially heated pre-form is ejected from the mold and subsequently transferred to a curing oven to be heat-cured by raising the friction material temperature linearly to approximately 300 degrees Fahrenheit over a 3-hour period and then maintaining the heated pre-form at the 300 degree Fahrenheit temperature for an additional 4 hours of process time. Variations of the herein-summarized method of friction pad element fabrication may be appropriate depending upon the particulars of the mixture formulation and component shape and size being formed.

Other materials, component shapes, and component sizes, including other functionally equivalent ingredients, may be utilized in the practice of the claimed invention.

Since certain changes may be made in the above-described system and apparatus not departing from the scope of the invention herein and above, it is intended that all matter contained in the description or shown in the accompanying drawings shall be interpreted as illustrative and not in a limiting sense.

I claim my invention as follows:

1. In a vehicular wheel brake assembly, in combination:

a first friction-generating friction pad assembly having a metallic backing plate element and a resin-bonded metallic friction pad element joined to the backing plate element;

a second friction-generating friction pad assembly having a metallic backing plate element and a resin-bonded non-asbestos, non-metallic friction pad element joined to the backing plate element; and means for simultaneously activating said first and second friction pad assemblies to generate friction at the surfaces of said resin-bonded metallic friction pad element and said resin-bonded non-asbestos, non-metallic friction pad element.

2. The vehicular wheel brake assembly defined by claim 1 wherein said resin-bonded metallic friction pad element is comprised of approximately from 25 to 60 parts metallic particles, approximately from 5 to 15 parts resin binder particles, approximately from 10 to 25 parts carbonaceous particles, approximately from 0 to 8 parts abrasive particles, approximately from 3 to 25 parts filler particles, and approximately from 0 to 10 parts friction particles, all said parts proportions being on a percentage weight basis.

3. The vehicular wheel brake assembly defined by claim 2 wherein said resin-bonded non-asbestos, non-metallic friction pad element is comprised of approximately from 10 to 25 parts fiber particles excluding asbestos fiber particles, approximately from 8 to 20 parts resin binder particles, approximately from 2 to 18 parts carbonaceous particles, approximately from 2 to 20 parts abrasive particles, approximately from 20 to 40 parts filler particles, and approximately from 5 to 20 parts friction particles, all said parts proportions being on a percentage weight basis.

4. The vehicular wheel brake assembly defined by claim 1 wherein said resin-bonded non-asbestos, non-metallic friction pad element is comprised of approximately from 10 to 25 parts fiber particles excluding asbestos fiber particles, approximately from 8 to 20 parts resin binder particles, approximately from 2 to 18 parts carbonaceous particles, approximately from 2 to 20 parts abrasive particles, approximately from 20 to 40 parts filler particles, and approximately from 5 to 20 parts friction particles, all said parts proportions being on a percentage weight basis.

5. A resin-bonded brake friction pad element comprising approximately from 25 to 60 parts metallic particles, approximately from 5 to 15 parts resin binder particles, approximately from 10 to 25 parts carbonaceous particles, approximately from 0 to 8 parts abrasive particles, approximately from 3 to 25 parts filler particles, and approximately from 1 to 10 parts friction particles, all said parts proportions being on a percentage weight basis.

6. A brake friction pad element comprising approximately from 10 to 25 parts fiber particles excluding asbestos fiber particles, approximately from 8 to 20 parts resin binder particles, approximately from 2 to 18 parts carbonaceous particles, approximately from 2 to 20 parts abrasive particles, approximately from 20 to 40 parts filler particles, and approximately from 5 to 20 parts friction particles, all said parts proportions being on a percentage weight basis.

* * * * *